United States Patent [19]

Reiter et al.

[11] 3,862,066

[45] Jan. 21, 1975

[54] METHOD FOR MAKING RIGID VINYL CHLORIDE POLYMER COMPOUNDS

[75] Inventors: William M Reiter; James E. Cooper, both of Mentor, Ohio; Walter J. Lilley, Mountain Lakes, N.J.

[73] Assignee: Universal PVC Resins, Inc., Plainesville, Ohio

[22] Filed: Jan. 28, 1972

[21] Appl. No.: 221,799

Related U.S. Application Data

[63] Continuation-in-part of Ser. No. 147,173, May 26, 1971, abandoned.

[52] U.S. Cl. 260/23 XA, 260/28.5 A, 260/29.6 PM, 260/45.75 K, 260/45.75 R, 260/45.85 R, 260/92.8 A, 260/879, 260/880 R
[51] Int. Cl. .................. C08f 19/14, C08f 21/04
[58] Field of Search .. 260/23 XA, 28.5 A, 29.6 PM, 260/45.75 R, 45.85 R, 879, 880 R, 92.8 A

[56] References Cited
UNITED STATES PATENTS

| | | | |
|---|---|---|---|
| 2,322,309 | 11/1952 | Morgan | 260/92.8 W |
| 2,616,884 | /1952 | Marons | 260/92.8 A |
| 3,091,602 | 5/1963 | Himes et al. | 260/84.3 |
| 3,375,215 | 5/1971 | Kane | 260/23 XA |
| 3,460,828 | 9/1969 | Perrins | 260/23 X A |
| 3,535,220 | 10/1970 | Georgiana | 260/23 X A |
| 3,535,256 | 10/1970 | Siano et al. | 260/23 XA |
| 3,539,480 | 11/1970 | Groff et al. | 260/23 X A |
| 3,567,669 | 3/1971 | Georgiang | 260/23 X A |
| 3,580,975 | | Rademacher | 260/23 X A |

*Primary Examiner*—Melvyn I. Marquis
*Assistant Examiner*—William E. Parker
*Attorney, Agent, or Firm*—Wilbur J. Kupfrian; David S. Abrams

[57] ABSTRACT

An improved method for making rigid vinyl chloride polymer compounds based on polyvinyl chloride suspension resin involves polymerizing vinyl chloride monomer in aqueous suspension in the presence, as additives, of dissolved or dispersed lubricant and stabilizer and at least one other additive selected from the group consisting of dispersed pigment and dispersed polymeric polymer modifier, which additives have been added to the polymerization vessel prior to or after initiation but before termination of the polymerization in amount calculated to incorporate each additive in the polymer in predetermined proportion with respect to the polymer, based on the amount of polymer formed at predetermined level of monomer conversion in the range of between 50 percent and 92 percent, and then short-stopping the polymerization at that predetermined level of conversion by adding a short-stopping agent, so that the lubricant, stabilizer and other additive are homogeneously incorporated into the polymer in controlled, predetermined proportions with respect to the polymeric polymer.

41 Claims, No Drawings

3,862,066

METHOD FOR MAKING RIGID VINYL CHLORIDE POLYMER COMPOUNDS

This is a continuation-in-part of application Ser. No. 147,173, filed May 26, 1971 now abandoned.

SUMMARY OF THE INVENTION

The present invention relates to an improved method for making rigid vinyl chloride polymer compounds containing stabilizers and lubricants and, in addition, pigments and/or polymeric polymer modifiers, which compounds are suitable for fabrication by methods conventionally applied to rigid polyvinyl chloride, such as extrusion, molding, calendering and blowing to obtain products such as sheets, building panels, pipes, pipe fittings, ducts, or bottles. These compounds are characterized as rigid in that they do not contain more than about 10 percent by weight of added liquid plasticizer, based on the weight of the polymer.

The improved method of the present invention involves incorporating additives conventionally contained in rigid vinyl chloride polymer compounds (i.e. stabilizer, lubricant, and, in addition, pigment and/or polymeric polymer modifier) in the polymerization step by adding them directly to the polymerization vessel prior to or during, but before termination of polymerization so that polymerization is conducted in the presence of dispersed or dissolved additives, which are present in amount calculated to incorporate them in the polymer in predetermined proportion with respect to the polymer, based on the amount of polymer to be formed at predetermined level of conversion of monomer to polymer in the range of about 50 to 92 percent of the monomer charge, and then short-stopping the polymerization at that predetermined level of conversion by adding a short-stopping agent, so that lubricant, stabilizer, and other additive are homogeneously incorporated into the polymer in controlled, predetermined proportions. Following polymerization, the rigid vinyl chloride polymer compound is recovered from the polymerization medium using conventional procedures, such as dewatering the polymer by centrifuging, followed by drying at elevated temperature. As compared to rigid vinyl chloride polymer compound made by conventionally employed dry-blending procedures, compound made in accordance with the method of the present invention has improved homogeneity, improved uniformity from batch to batch, improved stability, and can be extruded at a faster rate.

BACKGROUND OF THE INVENTION

Rigid polyvinyl chloride is a low cost thermoplastic material having in combination, good impact strength, good moldability, low weight, and resistance to combustion, corrosion and attack by acids. For these reasons, it has found wide application in products such as building panels, pipes, pipe fittings, ducts, blown bottles and the like, which are made from rigid vinyl polymer compounds by extrusion, calendering or molding. To make polyvinyl chloride suitable for fabrication by these methods it is necessary to add to it one or more stabilizers, lubricants, pigments and polymer modifiers. These required additives are conventionally added to the resin by methods involving intense mechanical working at elevated temperature in the range of about 80° to 180°C. as, for example, on a roller mill or in high intensity mixers, followed by cooling, usually by agitating it in an externally cooled ribbon blender. While this method is widely employed in industry for making rigid polyvinyl chloride compounds, it suffers disadvantages because it (a) requires subjecting the resin to elevated temperatures, thereby introducing potential instability which may show up during later fabrication of the resin, and (b) results in compounds of less than perfect homogeneity. If a higher degree of homogeneity is required, and if uniform dispersion of the pigment throughout the compound is desired, then the above-described blending operation must be followed by further blending in an extruder.

It has also been proposed to add one or more of these additives directly to the polymerization vessel at various stages of polymerization for the purpose of incorporating them uniformly into the vinyl chloride resin as it is being formed. While that method may eliminate a separate blending operation, it has heretofore not been commercially successful, principally for the reason that it does not allow precise proportioning of additives and resin in the compound so that compound so produced shows significant variation from batch to batch, making it unsuitable for fabrication on commercial basis.

A further method for making vinyl chloride polymer compounds which has recently been proposed involves first mixing the additives in liquid organic carrier wherein the polyvinyl chloride is insoluble and wherein the additives are either dispersible or soluble, then mixing the additive/carrier blend with vinyl chloride resin under pressure to impregnate the resin particles with the additives and finally removing the organic liquid carrier. In accordance with that method, the organic carrier/additive blend is contacted with the vinyl chloride resin by various suitable methods subsequent to polymerization. While the method yields finely divided vinyl chloride polymer compounds of good homogeneity, it still requires a separate processing step.

It is an object of the present invention to provide an improved method for making rigid vinyl chloride polymer compounds of improved homogeneity.

It is a further object of the present invention to provide an improved method for making rigid vinyl chloride polymer compounds by simplified procedure to obtain compositions which combine improved homogeneity with uniformity from batch to batch.

DETAILED DESCRIPTION OF THE INVENTION

In accordance with the present invention, we have discovered an improvement in the method for making rigid vinyl chloride polymer compounds based on polyvinyl chloride resin obtained by polymerization of monomer in aqueous media in the presence of suspending agent using monomer-soluble initiator and containing as additives stabilizer, lubricant, in addition, pigment and/or polymeric polymer modifier wherein one or more of the additives is incorporated into the resin by direct addition to the polymerization vessel prior to, during or following polymerization, which improvement comprises, in combination, (a) conducting the polymerization in the presence, as additives, of dissolved or dispersed lubricant and stabilizer and at least one other additive selected from the group consisting of dispersed pigment and dispersed polymeric polymer modifier, which additives have been added to the polymerization vessel prior to or after initiation, but before termination of the polymerization, in amount calculated to incorporate the additives in the polymer in predetermined proportion with respect to the polymer, based on the amount of polymer to be formed at predetermined level of conversion of monomer to polymer in the range of between 50 percent and 92 percent of the monomer charge, and (b) short-stopping the polymerization at that predetermined level of conversion by adding a short-stopping agent, so that the lubricant, stabilizer, and other additive are homogeneously incorporated into the polymer in controlled, predetermined proportion.

A critical feature of the improved method in accordance with the present invention is the addition of a short-stopping agent to terminate the polymerization at predetermined level of conversion, whereby it is possible to precisely control the proportion of additive, with respect to the polymer, in the polymer compound obtained. In the event that polymerization is not terminated at predetermined level of conversion by short-stopping it in accordance with the improvement of the present invention, relative proportions of additives and polymer in the compound will vary from batch to batch because of variations in the total amount of polyvinyl chloride formed from batch to batch at varying levels of conversion. While polymerization of vinyl chloride is conventionally terminated by relieving monomer pressure at conversion ranging from about 60 percent to about 95 percent, it was found that under these conditions undesirable, uncontrollable post-polymerization takes place, of extent varying from batch to batch, causing substantial variations in the overall amount of polymer produced.

As a result of presence within the polymerization medium of the additives during all or part of the formation of the polymer, the additives are incorporated therein uniformly to yield compounds of homogeneous composition. As a result of improved homogeneity, compounds made in accordance with the improved method of the present invention can be fabricated into shaped articles having excellent surface characteristics and appearance essentially free from undesirable ridges, grooves and other surface irregularities. Extruded articles made from these compounds, such as pipes, have greatly improved appearance. Further, the compounds made in accordance with the improved method of the present invention have enhanced ease of fabrication and color retention during extrusion fabrication. Since the improved method of making these vinyl chloride polymer compounds does not involve treatment at elevated temperature, such as is required by conventional high intensity mixing or extrusion blending procedures, these compounds have improved heat stability on subsequent fabrication.

The rigid vinyl chloride polymer compound made in accordance with the improved method of the present invention are characterized in that they contain at least 70 percent by weight of vinyl chloride polymer and in that they may not contain more than about 10 percent by weight of added normally liquid plasticizer.

The vinyl chloride polymer included in the rigid vinyl chloride polymer compositions made by the improved method in accordance with the present invention includes any rigid or essentially rigid vinyl chloride homopolymer or interpolymers thereof with copolymerizable monomers such as vinyl esters of organic acids containing 1 to 18 carbon atoms as, e.g., vinyl acetate, vinyl stearate and the like; vinylidene fluorochloride; vinylidene chloride; symmetrical dichloroethylene; acrylonitrile; methacrylonitrile; alkylacrylate esters wherein the alkyl group contains 1 to 8 carbon atoms as, e.g. methyl, ethyl and butyl acrylate; the corresponding alkyl methacrylate esters; dialkyl esters of dibasic organic acids in which the alkyl groups contain 1 to 8 carbon atoms, as, e.g. dibutyl fumarate and diethyl maleate; unsaturated hydrocarbons, such as ethylene, propylene, isobutene and the like; allyl compounds, such as allyl acetate, allyl chloride, allyl ethyl ether and the like; and conjugated and cross-conjugated ethylenically unsaturated compounds, such as butadiene, isoprene, chloroprene, divinyl ketone and the like, wherein the vinyl chloride comprises at least about 85 mol percent. For a fairly complete list of materials known to polymerize with vinyl chloride, reference is made to Krczil, "Kurzes Handbuch der Polymerizations Technik - II Mehrstoff Polymerization," Edwards Bros. Inc. (1945), pp. 735–747, the items under "Vinyl Chloride." The term "vinyl chloride polymer" as used in the specification and claims is intended to include the above-described homo- and copolymers.

The term "lubricant" as used in the specification and claims includes natural and synthetic waxes such as carnauba wax; montan wax; paraffin wax; low molecular weight polyethylene; oxidized polyethylene based on low density or high density polyethylene; high molecular weight fatty acids containing from about 8 to about 20 carbon atoms and their metal salts and esters, such as, for example, aluminum stearate, calcium stearate, lead stearate, lithium stearate, magnesium stearate, zinc stearate, n-butyl stearate, ethyl palmitate, and glyceryl tristearate; further, amides derived from fatty acids, such as stearic acid and specifically N,N'-ethylene-bis-stearamide. Specific examples of preferred lubricants include parafin wax, low molecular weight polyethylene, oxidized polyethylene based on high density or low density polyethylene, calcium stearate, and N,N'-ethylene-bis-stearamide. All of the above listed materials are commercially available specifically for use as lubricants in polyvinyl chloride compositions. The presence of one or more lubricants in rigid vinyl chloride polymer compounds is critically required in order to prevent sticking of the compound during processing and to decrease internal and external friction, and consequently heating of product due to mechanical work, thereby reducing the heat history and contributing to stability of the finished article.

It has further been found that in order to obtain optimum extrusion performance and finished product properties, rigid vinyl chloride polymer compounds require presence of at least two different lubricants, i.e., at least one lubricant selected from the group consisting of carnauba wax, montan wax, paraffin wax, and fatty acids having from about 8 to about 20 carbon atoms and their metal salts and esters; together with at least one lubricant selected from the group consisting of low molecular weight polyethylene, oxidized polyethylene based on low density or high density polyethylene, and amides derived from fatty acids having from about 8 to about 20 carbon atoms. Specific examples of preferred lubricant combinations include the combinations of paraffin wax together with oxidized polyethylene based on low density (0.90 to 0.95) polyethylene containing up to about 5% by weight of oxygen, and of calcium stearate together with the same oxidized polyethylene. Other types of preferred lubricant combinations are illustrated in the Examples, infra.

Lubricant is generally employed in amount of from about 0.2 to about 5 percent by weight, based on the weight of the polymer, preferably in amount of about 0.4 to about 3 percent. Use of excess lubricant reduces physical properties of the finished fabricated article, and prevents extrusion on single screw extruders which require friction within the extrusion chamber in order to develop required extrusion pressures. Hence, lubricant is employed in minimum amount sufficient to facilitate fabrication. In vinyl chloride polymer compounds intended for fabrication into pipe, most preferred amount of lubricant ranges from about 1.5 to about 2.5 percent by weight. These amounts apply whether a single lubricant is used, or whether two or more lubricants are used in combination, in which event their combined amount will be within the above-stated ranges.

The term "pigment" as used in the specification and claims includes all inert fillers as well as inorganic pigments customarily added to rigid polyvinyl chloride for purposes of pigmentation, cost reduction or improving certain characteristics thereof, such as stiffness, thermal conductivity, plateout, electrical insulating properties and hardness. Fillers and pigments are both included under the term "pigment" because, for purposes of the method of the present invention they involve similar considerations. Fillers commonly incorporated into rigid vinyl chloride polymer compositions include calcium carbonate, calcium silicate, sodium silicate, calcined clay, lead sulfide, antimony oxide, zinc oxide, carbon blacks, micas, talcs, fumed silica and other finely-divided silicon dioxide, titanium dioxide, rutile as well as anatase, and the like. Carbon black and titanium dioxide in particular protect vinyl compositions against weathering and light degradation. Fumed silica, employed in amounts of about 0.1 to 1.0 percent by weight, improve plate-out. Suitable inorganic pigments include chrome yellow and chrome orange, wherein the principal component is lead chromate; molybdenum orange; strontium chromite; iron oxides and chromium oxides; cadmium pigments, especially cadmium sulfide and cadmium sulfoselenide; ultramarine blue, which is a complex compound of $SiO_2$, $Al_2O_3$, $Na_2O$, S and $SO_3$ as well as metal powders, such as bronze powders. Organic pigments generally are unsuitable for addition during polymerization as contemplated by the present invention because they tend to decompose under the free radical conditions prevailing in the polymerization phase, interfering with the polymerization and resulting in undesirable color change. In general, calcium carbonate, carbon black and titanium dioxide are especially useful pigments.

Pigments may be employed in amount up to about 30 percent by weight, based on the weight of the vinyl chloride polymer, preferably in amounts of from about 1 to about 15 percent, more preferably yet in amount of from about 2 to about 5 percent.

Stabilizers suitable for use in making the vinyl chloride polymer compound in accordance with the improved method of the present invention include all of the materials known to stabilize polyvinyl chloride against degradative action of heat and/or light. They include all classes of known stabilizers, such as metal salts of mineral acids, salts of organic carboxylic acids, organo-tin compounds, epoxides, amine compounds and organic phosphites.

Salts of mineral acids suitable for use as stabilizers in the improved method of the present invention include carbonates, for example sodium carbonate and basic lead carbonate; sulfates, such as tribasic lead sulfate monohydrate and tetrabasic lead sulfate; silicates, such as coprecipitated basic lead silicate sulfate, lead orthosilicate, the silicates of calcium, barium and strontium; phosphates, such as trisodium phosphate, tetrasodium pyrophosphate, sodium hexametaphosphate, dibasic lead phosphate and sodium monohydrogen phosphate; phosphites, such as sodium and potassium phosphite, dibasic lead phosphite, and barium/sodium phosphite.

Typical salts of organic carboxylic acids suitable for use as stabilizers in the improved method of the present invention include stearates, laurates, caprates, ricinoleates and undecylates of metals such as lead, cadmium, manganese, cerium, lithium, strontium, sodium, calcium, tin, barium, magnesium, especially dibasic lead stearate, and the stearates and laurates of cadmium, barium, calcium, strontium, magnesium, tin and lead, as well as the salts of other aliphatic, monocarboxylic acids, unsaturated acids and diacids of the abovementioned metals, such as those of 2-ethylhexoic, 2-ethylbutyric, 2-methyloctanoic, triethylmaleic and monocyclohexylmaleic acid, including the aconitates, itaconates, and citraconates of barium, cadmium and zinc. Further included are the metal salts of aromatic acids such as phthalates, naphthenates, and salicylates, including basic lead phthalate, tin phthalate, strontium naphthenate, cadmium naphthenate, barium diisopropyl salicylate and calcium ethylacetoacetate. Some of the above-mentioned stabilizers, as, for example, the above-described metal salts of organic carboxylic acids, especially the stearates and laurates of lead, cadmium, manganese, lithium, strontium, sodium, calcium, tin, barium, and magnesium, also function as lubricants.

Suitable organo-tin stabilizers include those having the formula $$R^1_m - Sn - X_{4-m}$$

(1)

wherein
1. $m$ is an integer from 1 to 3;
2. $R^1$ is a radical selected from the group consisting of alkyl, aryl, alkaryl and aralkyl radicals;
3. X is a radical selected from the group consisting of radicals having the formulas $-OR^2$, $R^2COO-$, $R^2OOCR^3COO-$ $-SR^2$, $-SR^3OH$, $-OOCR^3SH$, $-SR^3COOR^2$, $-SR^3COO-R^3-COOR^3S-$, $-OOCR^3COO-$ and $-SR^3COO-$, which radicals, when divalent, may be bound to the same or a different Sn atom, wherein
   a. $R^2$, which may be the same or different, is selected from the group consisting of alkyl, aryl, alkaryl and aralkyl radicals, and
   b. $R^3$, which may be the same or different, is a divalent bridging group selected from the group consisting of alkylene, arylene, aralkylene and alkarylene radicals.

In the above formulas the $R^1$, $R^2$ and $R^3$ radicals are preferably aliphatic radicals. More preferably, they are straight-chain aliphatic radicals having from 1 to 10 carbon atoms. The n-butyl group is the preferred embodiment of the R¹ radical. In more preferred embodiments integer m is 2.

Specific examples of suitable organo-tin stabilizers include di-n-butyl tin bis-(monomethylmaleate), di-n-butyl tin bis-(isooctyl thioglycolate), di-n-butyl tin bis-mercaptopropanoate, di-n-butyl tin bis-(2-ethylhexanoate), di-n-butyl tin bis-(isobutyl thioglycolate), di-n-butyl tin diacetate, di-n-butyl tin dilaurate, di-n-butyl tin laureate maleate, tri-n-butyl tin stearate, tri-n-butyl tin laurate, n-butyl tin tris-(isobutyl thioglycolate), tri-n-butyl tin isobutyl thioglycolate, n-butyl tin triacetate, and mixtures thereof.

Suitable epoxide stabilizers include the glycidyl ethers, including those of allyl alcohol and its polymerizates as well as those of diethylene glycol, glycerine, naphthol, resorcinol, diisobutylphenol, tetraphenylol methane and diphenyl propane (Bis-phenol A). Also included are the reaction products of Bisphenol A glycidyl monoether with epichlorohydrine; the glycidyl alcohol esters, such as glycidyl oleate and glycidyl laurate; and, importantly, unsaturated epoxy esters, especially those based on natural glycerides or the esters of natural or artificial acids and synthetic alcohols. Within this latter class are included natural epoxidized oils, such as epoxidized soya-bean and cotton seed oil; epoxidized tallow and lard; the products of esterification of an epoxidized fatty acid and a synthetic alcohol, and completely synthetic esters such as epoxyalkylsuccinic acids. Exemplary specific epoxy stabilizers include methyl epoxystearate, butylic ester of epoxidized soyabean oil, tetrahydro-furfuryl-ester of epoxidized soyabean oil, epoxystearate of monobutylic ether of diethylene glycol, cyclohexyl epoxy-stearate, 2-ethyl-butyl epoxystearate, 2-ethyl-hexyl epoxystearate, methoxyethyl epoxystearate, phenyl epoxystearate, butyl epoxy-tallate, Sorbitanpolyoxyethylene triepoxystearate, hexyl epoxystearate, and others. Also suitable are the metal salts of epoxidized fatty acids, especially the zinc, cadmium, strontium, barium or lead salts of epoxy stearic acid, acids extracted from cotton seed oil and epoxidized soya-bean oil. Further epoxy-type stabilizers include the epoxy derivatives obtained by multistep procedures starting with cyclohexane such as, for example, 9-10-epoxystearate of 3,4-epoxycyclohexylmethane, 9-10-diepoxystearate of 3,4-epoxy cyclohexylmethane, and iso-octyl-9-10 epoxystearate.

All of the above-listed epoxide stabilizers have some lubricating properties, so that they also function, and are suitable for use as lubricants in the improved method of the present invention.

Suitable amine stabilizers include diphenyl amine, thiourea, aryl thiourea, N,N'-bis-(p-hydroxyphenyl)urea, N-phenyl-N'-(p-dimethylaminophenyl)thiourea, alkyd resins resulting from condensation of mono-, di- or triethanolamine with unsaturated acids particularly maleic acid, 2-phenyl-indole, N,N'-bis-carboethoxyisopropanol urea, monophenyl urea, monophenyl thiourea, diphenyl thiourea, beta-ethylaminocrotonate, esters of acid betaaminocrotonate, condensation products of substituted amines and diacids, and of ethanolamine and unsaturated acids.

Suitable organic phosphite stabilizers include triphenyl, trioctyl, tricresyl mono- or dialkyl or aryl phosphites and mixed salts thereof, such as cadmium alkylaryl phosphite, cadmium alkyl phosphite and zinc alkylaryl phosphite. Organic phosphite stabilizers are preferably used in conjunction with any of the above-described metallic soaps, epoxy derivatives or, especially, organo-tin compounds.

As is well known to those skilled in the art, stabilizers are often employed in combinations of two or more of the above-mentioned stabilizers, and the term "stabilizer" as used in the specification and claims is intended to denote single stabilizers as well as combinations of two or more stabilizers.

For a detailed treatment of stabilizers and stabilizer combinations suitable for use in polyvinyl chloride, including those herein discussed as suitable for use in the method for making vinyl chloride polymer compounds, reference is made to F. Chevassus and R. Broutelles, "The Stabilization of Polyvinyl Chloride," St. Martin's Press, New York, 1963.

It should, of course, be realized that some of the above-mentioned stabilizers, as hereinbefore defined, when added directly to the polymerization system while polymerization is in process, have the tendency to reduce the rate of polymerization or to inhibit it altogether. Stabilizers which tend to reduce polymerization rate are preferably added towards the end of the polymerization prior to addition of the short-stopping agent, say at about 40–80 percent conversion. Those stabilizers which are effective as short-stopping agents in that they substantially completely inhibit polymerization when added to the polymerization vessel while polymerization is in progress in amounts of 0.01 to 3.0 percent by weight, based on the weight of the monomer charge, are suitable for use as short-stopping agents in accordance with the method of the present invention. An exemplary listing of stabilizers which tend to inhibit polymerization and which are suitable for use as short-stopping agents in accordance with the present invention include the sulfur-containing organo-tin stabilizers, especially di-n-butyl tin S,S'-bis-(isooctyl mercapto acetate), di-n-butyl tin-bis-mercaptopropanoate, di-n-butyl tin bis-(isobutyl thioglycolate), n-butyl tin tris-(isobutyl thioglycolate), and tri-n-butyl tin isobutyl thioglycolate, as well as organic phosphites, as hereinbefore described, and mixed salts thereof.

Suitable short-stopping agents for use in accordance with the method of the present invention include alpha-methyl-styrene; bisphenol A; acetophenone; hydroquinone; naphthoquinone; thioalcohols, amines, as for example diphenylamine, triphenylamine, triethylamine and ethylenediamine tetraacetic acid, phenol and natural tar acids. Other suitable short-stopping agents include conjugated trienic terpenes; alpha-alkyl-alpha, beta-unsaturated ketones such as methyl isopropenyl ketone, 4-ethoxy-3-methyl-3-butene 2-one, 3-methyl-4-phenyl-3-butene-2-one, 3-methyl-4-phenyl-3-pentene-2-one, and mixtures thereof; vinyl pyridine in which any substituents are alkyl ring substituents, such as 2-vinyl pyridene, 3-vinyl pyridine and 4-vinyl pyridene, 2-methyl-5-vinyl pyridene, 5-ethyl-2-vinyl pyridene, 2,4-dimethyl-6-vinyl pyridene and mixtures thereof; conjugated diolefin hydrocarbons such as 1,3-butadiene, isoprene, 2,3-dimethyl butadiene-1,3, cyclopentadiene, 1-vinyl cyclohexene; chloroprene; ring unsaturated cyclomonoolefin, such as cyclopentene, cyclohexene, cycheptene, or cyclooctene; styrene, nuclear-substituted chlorostyrenes, alpha-alkyl-substituted styrenes and alpha-alkyl-substituted nuclear chloro-substituted styrenes, such as monochlorostyrene, 3,4-dichlorostyrene, pentachlorostyrene, alpha-methylstyrene, alpha-methyl 3,4-dichlorostyrene and mixtures thereof; polyunsaturated monocarboxylic acids, such as sorbic acid, furylacrylic acid, linoleic acid, linolenic acid, eleostearic acid, soya-bean oil fatty acids, beta-vinyl acrylic acid, geranic acid, dehydrogeranic acid and mixtures thereof; unsaturated aldehydes having ethylenic unsaturation such as cinnamaldehyde, acrolein, methacrolein, crotonaldehyde, tiglic aldehyde citral, citronellal, and mixtures thereof; acrylonitrile and methacrylonitrile; and aromatic nitro compounds, such as nitrobenzene and nitronaphthalene.

The short-stopping agent is employed in amount effective to terminate the polymerization reaction. Generally, less than about 2 percent by weight, based on the orginally charged vinyl chloride monomer, is sufficient. For practical purposes the amount of short-stopping agent required to terminate polymerization will range between about 0.05 to about 2 percent by weight of the vinyl chloride monomer charge.

It is to be understood that when a stabilizer is used as short-stopping agent as described supra, then addition of a second stabilizer to the polymerization mass prior to addition of the stabilizer which also acts as short-stopping agent (short-stopping agent/stabilizer) is still required in order to obtain compound having desired advantageous properties, as above described.

As used herein, the term polymeric "polymer Modifier" refers to impact improvers and processing aids. Impact improvers are added to vinyl chloride polymer compositions to improve the impact resistance of the compositions for certain applications, such as in the manufacture of impact-resistant rigid pipe. These impact improvers are rubbery polymers having a glass-transition temperature below room temperature and, when added to vinyl chloride polymer compositions in amounts of up to about 15 percent, increase the Izod impact strength up to about 22 ft. lb/in. notch. Unlike plasticizers, impact improvers are not completely compatible with vinyl chloride polymer and consequently are present as a separate phase of discrete particles. A wide variety of impact improvers are commercially available. The principal types are chlorinated polyethylene and interpolymers of butadiene, styrene and an ethylenically unsaturated polar monomer, such as acrylonitrile and lower alkyl esters of acrylic and methacrylic acid. Acrylonitrile-butadiene-styrene (ABS) polymers and methyl methacrylate-butadiene-styrene polymers are especially commonly used. In addition, a large number of other impact improvers for vinyl chloride polymer are disclosed in many patents, of which the following U.S. patents are representative: Nos. 2,719,137; 2,808,387; 2,970,979; 3,448,173.

The use of an impact improver is normally accompanied by the addition of a processing aid. Processing aids are polymers which enhance flow behavior during processing and give better surface smoothness and gloss to the finished produce. Processing aids are typically homopolymers of lower alkyl esters of acrylic acid and methacrylic acid particularly methyl methacrylate. Styrene-acrylonitrile copolymers are also used. Processing aids are generally employed in an amount of about 1 to 3 percent by weight based on the vinyl chloride polymer.

Polymeric polymer modifiers suitable for use herein and cleared by the U.S. Food and Drug Administration for use in vinyl chloride polymers for food packaging application are described in FDA regulation 21 CFR 121.2597, "Polymer modifiers in semirigid and rigid vinyl chloride plastics."

Polymeric polymer modifiers are commercially available both as solids and as lactices. Either form may be employed in this invention, but the latex form is generally more convenient.

Some polymeric polymer modifiers, especially interpolymers derived from butadiene and styrene, tend to reduce the rate of polymerization of vinyl chloride. Such polymeric polymer modifiers are preferably added toward the end of the polymerization, but prior to the addition of the short-stopping agent. Preferably, the polymeric polymer modifier is added when the degree of conversion is up to 20 percent, preferably 10 percent, by weight based on the monomer charge, less than the predetermined level of conversion. For example, if the predetermined level of conversion is 80 percent, the polymeric polymer modifier is added when the degree of conversion is at least 60 percent, preferably at least 70 percent.

Polymeric polymer modifiers which do not tend to reduce the rate of polymerization, such as chlorinated poly(vinyl chloride) and chlorinated polyethylene, may be added to the initial polymerization mixture.

Except for presence during polymerization of one or more of the above-described pigments, lubricants, stabilizers, and polymeric polymer modifiers during the polymerization reaction, and short-stopping the reaction at predetermined level of monomer conversion in the range of between 50 to 92 percent, preferably in the range of between about 75 and 85 percent, the method of the present invention follows conventional procedure. The polymerization is carried out in the presence of conventional monomer-soluble free-radical type polymerization initiators such as organic peroxides, e.g., diacetyl peroxide, dibenzoyl peroxide, acetyl benzoyl peroxide, acetyl cyclohexyl sulfoxyl peroxide, lauroyl peroxide, cumene hydroperoxide, tertiary butyl hydroperoxide, diisopropyl peroxy dicarbonate, dicyclohexyl peroxy dicarbonate, dibenzyl peroxy dicarbonate, tertiary butyl peroxypivalate, t-butyl peroxyneodecanoate, or of azo compounds such as alpha-alpha'-azo-bisisobutyronitrile, 2,2'-azobis(4-methoxy-2,4-dimethyl valeronitrile), or p-methoxybenzene diazothio-2-naphthyl ether. Initiators are employed in conventional amounts, i.e. ranging from about 0.05 to about 3 percent by weight, based on the weight of vinyl chloride monomer charged.

As previously stated, monomer-soluble additives are preferably added to the polymerization vessel prior to monomer charge. Solid, monomer insoluble additives are added prior to monomer charge as a matter of convenience, but may be added while polymerization is in progress, and prior to its termination. Preferably, however, all additives are added before conversion of monomer to polymer exceeds about 80 percent, more preferably yet about 60 percent because at higher degrees of conversion the polymer particles lack sufficient porosity to substantially incorporate these additives within or on the surface of the polymer particles. As is well known, porosity of vinyl chloride polymer particles is a function of conversion, and decreases with increasing conversion. It has been found that a certain minimum amount of porosity is required to substantially incorporate the additives, especially solid additives, into vinyl chloride polymer particles, using the invention method, which porosity is that obtained at level of at most about 80 percent of conversion, preferably at most about 60 percent of conversion.

Additives are preferably added to the polymerization vessel before conversion of monomer to polymer exceeds about 80 percent when termination of polymerization is effected at 85 percent conversion, and about 60 percent when termination of polymerization is effected at 70 percent conversion, and at corresponding intermediate levels of conversion when polymerization is terminated at levels between 70 and 85 percent.

The polymerization requires, as is conventional, presence of suspending agent such as polyvinyl alcohol, methyl cellulose or gelatin. The suspending agent is employed in conventional amounts ranging between about 0.01 and about 1 percent by weight, based on the weight of the aqueous medium. The monomer to water ratio, as is conventional, ranges between about 1:1 and about 1:2, preferably between about 1:1.1 and about 1:1.7. Polymerization temperatures are those commonly employed in suspension polymerization of vinyl chloride, i.e. ranging between about 40° and about 75°C., preferably between about 50° and about 65°C. A second suspending agent, such as sorbitan monolaurate or sodium lauryl sulfate, can also be employed to improve the porosity of the polymer particles.

Those of the above-described additives, i.e. pigments, lubricants and stabilizers which are insoluble in the monomer should be charged to the polymerization vessel in finely divided form, i.e., having particle size of less than about 100 microns, preferably of less than about 50 microns. Normally solid monomer-soluble additives can be of any suitable particle size, although it is preferred that they pass through a 4 mesh sieve, U.S. Series.

The additives may be charged neat or in solution or suspension, if desired. In a particularly desirable embodiment lubricants, pigments and stabilizers are slurried in water in desired proportion by adding them to an agitated mix tank, and metered or weighed portions of that slurry are charged to the reaction vessel. This particular embodiment has the advantage to insure charging these additives in desired proportion with respect to each other. Also, addition of the additives is facilitated. The slurry, of course, should be kept constantly agitated to prevent settling of solid components.

In preferred operation monomer-soluble additives are charged to the reaction vessel prior to addition of the monomer so that they may be dissolved in the monomer, thereby insuring their inclusion within the polymer particles.

In operation, the polymerization vessel is charged with the required amount of demineralized water, followed by addition of those of the chosen additives which do not interfere with reaction, either in slurry premixed form, as above described, or separately in dry powder form or liquid form, as the case may be. At this point, if desired, the pH of the aqueous medium may be adjusted by addition of acidic, alkaline or buffering substances. During polymerization small amounts of chlorine are usually split off the monomer in the form of hydrochloric acid. Therefore, to maintain the pH of the aqueous polymerization medium near the neutral point, if that is desired, small amounts of alkali metal phosphates or carbonates may be added as buffers. However, it is possible to influence catalyst half-life, hence speed of polymerization reaction, through adjustment of the pH of the aqueous polymerization medium, as is known to the art. To that end it may be desirable to conduct the polymerization in an acidic medium at a pH of less than 7, say at a pH of between about 1 and about 6. In that event, acidic conditions in the aqueous medium may, for example, be established by addition of an inorganic acid, such as hydrochloric acid, sulfuric acid, or phosphoric acid, or of an inorganic acid salt such as acid phosphates or acid sulfates, especially those of aluminum. If desired, the pH of the aqueous polymerization medium may be maintained within narrow ranges throughout the polymerization reaction by use of known types of buffer systems.

The reaction vessel is then sealed, evacuated and charged with the monomer. After heating the contents to desired polymerization temperature, initiator is added and polymerization proceeds, under external cooling, to desired degree of conversion. Degree of conversion may be determined by methods known to those skilled in the art, as for example, by observing the density of the reaction medium, by drop of pressure within the polymerization vessel at constant temperature, or by measuring the heat evolved in the reaction mixture and correlating it with the extent of conversions on the basis of the known heat of reaction. Observance of pressure drop is a particularly convenient method of determining degree of conversion in a system wherein temperature is automatically maintained at predetermined level by regulating the jacket temperature. Onset of pressure drop signifies disappearance of separate liquid monomer phase, which occurs in suspension homopolymerization of vinyl chloride at 40° – 70°C. at about 70 – 85 percent conversion, usually at about 75 percent conversion. Generally, the relationship between degree of pressure drop at constant temperature and conversion is influenced by type and amount of additives employed. However, close correlation between them can be established for any particular compound formulation by conducting a few trial runs. Once this correlation has been so established, termination of polymerization, as above described, at predetermined degree of pressure drop insures termination of polymerization at desired predetermined degree of conversion. As soon as the desired degree of conversion has been reached, the polymerization reaction is short-stopped by adding the short-stopping agent. Thereafter the reactor is vented, unreacted monomer is drawn off, and liquid reactor contents are, as is conventional dewatered as, e.g., by centrifugation, and dried to obtain the finished rigid vinyl chloride polymer compound in dry form suitable for fabrication.

A particularly desirable embodiment of the method of the present invention employs as short-stopping agent a stabilizer of the organo-tin mercaptide type. That stabilizer/shortstopping agent is added to the vessel at conversion of between about 70 to 92 percent, more preferably between about 75 to 85 percent of conversion, at which conversion levels the stabilizer/short-stopping agent is still readily absorbed into the interstices of the individual polyvinyl chloride particles. If conversion is carried to levels higher than about 92 percent, then the stabilizer/short-stopping agent is no longer absorbed into the particles and consequently is lost in the dewatering step. However, if polymerization is short-stopped by addition of such short-stopping agent/stabilizer, then it is additionally preferred to delay venting of unreacted monomer for a time period of between about one-fortieth to one-fifth of the time elapsed from initiation of polymerization by addition of initiator to its termination by addition of short-stopping agent/stabilizer, more preferably about one-twentieth to about one-tenth of that elapsed time. Surprisingly, delay of monomer venting under these circumstances enhances thermal stability of the compound.

The following Examples set forth the best mode contemplated of carrying out the method of the present invention and illustrate specific preferred embodiments thereof. In these Examples, all parts are by weight, unless otherwise indicated.

EXAMPLE 1

To a glass-lined, jacketed, agitator-equipped vessel of 42,000 parts water capacity are charged 23,400 parts of demineralized water at 60° to 65°C., 10 parts of polyvinyl alcohol suspending agent, (about 80 percent hydrolyzed polyvinyl acetate), 1 part of silicone defoamer, 100 parts of calcium stearate powder (100 percent through 325 mesh U.S.). Vessel contents are agitated until the calcium stearate is uniformly dispersed. To the dispersion are then added 65 parts of dioctyl phthalate, 192 parts of finely divided titanium dioxide, 320 parts of finely divided calcium carbonate (less than 10 micron particle size), 150 parts of finely chipped paraffin wax, 40 parts of finely ground oxidized low density polyethylene having a number average molecular weight of about 1800, oxygen content of between 3 to 5 percent by weight and an acid number of about 19, followed by 6 parts of solid lauroyl peroxide (initiator). The vessel is sealed, evacuated and charged with 16,000 parts of vinyl chloride. Steam is applied to the vessel jacket to heat vessel contents to about 60°C. When temperature of 55°C. is reached, 7 parts of a 30 percent by weight solution of isopropyl peroxydicarbonate in toluene are added to the vessel under pressure. Polymerization proceeds while reactor contents through controlled cooling are maintained at 59°C. by circulating cooling water through the jacket. Internal reactor pressure remains relatively constant at between about 120 and 140 psig. After about 7 hours polymerization time, reactor pressure begins to gradually decline and after about 8 hours polymerization time is about 15 psig below the initially observed pressure. At that point, conversion of vinyl chloride monomer to polymer is about 82.5 percent and 255 parts of dibutyl tin S,S'-bis-(isooctyl mercapto acetate) are added as short-stopping agent and stabilizer. Agitation of vessel contents is continued for about 20 minutes, after which time excess vinyl chloride monomer is vented under vacuum to a recovery system. Vessel contents are then dewatered by centrifugation to obtain dry cake containing 20 percent water, which is then dried at elevated temperature in an air stream to water content of 0.2 to 0.3 percent by weight. The vinyl chloride polymer compound thus obtained is suitable for fabrication into rigid pipe.

EXAMPLE 2

The vessel employed in Example 1 is charged with 24,000 parts demineralized water of 60° to 65°C., 12 parts of polyvinyl alcohol (about 80 percent hydrolyzed polyvinyl acetate), 2 parts of silicone defoaming agent, 190 parts of calcium stearate in finely divided powder form, 192 parts of epoxidized soya-bean oil, 255 parts of finely divided titanium dioxide, 320 parts of finely divided calcium carbonate, 128 parts of chipped paraffin wax, 190 parts of N,N'-ethylene-bis-stearamide, followed by 6 parts of solid lauroyl peroxide. Vessel contents are agitated to thoroughly disperse additives. The vessel is sealed, evacuated, charged with 16,000 parts of vinyl chloride monomer and vessel contents are heated to 59°C. When that temperature is reached, 7 parts of a 30 percent solution of isopropyl peroxydicarbonate in toluene are introduced under pressure. Polymerization proceeds as in Example 1 except that 140 parts of dibutyl tin S,S'-bis-(isooctyl mercapto acetate) short-stopping agent and stabilizer is added on 18 lbs. pressure drop, corresponding to 80% conversion of monomer to polymer. After addition of short-stop agent, vessel contents are agitated for an additional 20 minutes, followed by recovery of vinyl chloride polymer compound as described in Example 1. The compound so obtained is suitable for extrusion into rigid pipe.

Example 3, below, shows preparation of polyvinyl chloride compound having composition of that made by Example 1, but using an additive premix.

EXAMPLE 3 a. Preparation of Premix

A stainless steel vessel, equipped with agitator, is charged with 13,130 parts of demineralized water and 182 parts of polyvinyl alcohol are dissolved therein. To the polyvinyl alcohol solution are added 3,435 parts of a 53 percent by weight dispersion of calcium stearate in water, and the dispersion is neutralized to pH of 7.0 to 7.5 by addition of hydrochloric acid. To the agitated dispersion are then added 3,470 parts of finely divided titanium dioxide pigment, 5,779 parts of finely divided calcium carbonate, 2,709 parts of finely chipped paraffin wax, followed by 723 parts of finely ground oxidized low density polyethylene having a number average molecular weight of about 1800 and oxygen content of about 3 to 5 percent by weight and an acid number of about 19. There are thus obtained about 20,470 parts of premix containing 49.8 percent of solids. This premix is maintained under constant agitation for addition to the polymerization vessel.

b. Polymerization

The vessel employed in Example 1 is charged with 22,600 parts of demineralized water, followed by 1,606 parts of premix. The premix is dispersed in the water and 65 parts of dioctyl phthalate are added, followed by 6 parts of lauroyl peroxide. The reactor is sealed, evacuated, and charged with 16,000 parts of vinyl chloride monomer. Following heating to 59°C. and addition of isopropyl peroxydicarbonate initiator, polymerization and vinyl chloride polymer compound recovery proceeds as in Example 1. The compound so obtained is suitable for extrusion into rigid pipe.

EXAMPLE 4

The following materials were charged to a polymerization vessel equipped with an agitator:

44,000 parts demineralized water
90 parts polyvinyl alcohol
137 parts dioctylphthalate
265 parts calcium stearate
596 parts titanium dioxide
663 parts calcium carbonate
225 parts chipped paraffin wax
18 parts t-butyl peroxypivalate
9 parts diisopropyl peroxycarbonate The water was heated to 63°C. before the other materials were added. After the other materials had been addded, the vessel was subjected to a vacuum for 15 minutes, then charged with 33,000 parts vinyl chloride and sealed.

Polymerization was carried out at 59°C. After the pressure in the vessel had dropped 20 psig (about 5 hours after initiation of polymerization), 2356 parts of a polymer modifier (Rohm & Haas KM-901) were added. KM-901 is a mixture of polymethylmethacrylate and methyl methacrylate-butadienestyrene polymer is a ratio of about 1:3 by weight. After addition of the polymer modifier, 265 parts dibutyl tin S,S'-bis(isooctyl mercapto acetate) were added as short-stopping agent and stabilizer. The vessel contents were then agitated for an additional 20 minutes, followed by monomer and polymer recovery as described in Example 1. The polymer composition obtained was suitable for fabrication into pipe having improved impact resistance.

The invention may be embodied in other forms, or carried out in other ways, without departing from the spirit or essential characteristics thereof. The present embodiments are, therefore, to be considered in all respects as illustrative and not restrictive, the scope of the invention being indicated by the appended claims.

We claim:

1. In the method for making rigid vinyl chloride polymer compositions based on polyvinyl chloride resin obtained by polymerization of monomer in aqueous media in the presence of suspending agent using monomer-soluble initiator, and containing stabilizers, lubricants and at least one additive selected from the group consisting of pigments and polymer modifiers, the improvement which comprises, in combination
   a. determining a desired level of conversion of monomer to polymer corresponding to a precise proportion of each additive to polymer produced, said desired level of conversion corresponding to a particular process pressure occurring during the polymerization,
   b. conducting the polymerization of the monomer to the polymer in a polymerization vessel in the presence of additives comprising dissolved or dispersed lubricant and stabilizer, said stabilizer not being a short-stopping agent for the polymerization reaction, and at least one other additive selected from the group consisting of dispersed pigment and dispersed polymeric polymer modifier, adding said additives to the polymerization vessel before termination of the polymerization in amount calculated to incorporate each additive in the polymer in said precise ratio based upon the amount of polymer to be formed at a conversion level of monomer to polymer in the range of between 50 and 92 percent of the monomer charge, and
   c. terminating the polymerization at said desired level of conversion by adding a short-stopping agent to said vessel at a point during the polymerization corresponding substantially to said particular process pressure, said addition of said short-stopping agent being subsequent to the addition of said lubricant, stabilizer and other additive so that the lubricant, stabilizer and said other additive are homogeneously incorporated into the polymer in a controlled, predetermined proportion.

2. The method of claim 1 wherein the polymerization is conducted at a temperature within the range of from about 40° to 75°C., and wherein polymerization is terminated at conversion between 70 and 90 percent.

3. The method of claim 2 wherein the polymerization is conducted in the presence as additive of dispersed pigment and dispersed or dissolved lubricant and stabilizer which have been added to the polymerization vessel before conversion of monomer to polymer exceeds about 80 percent when termination of polymerization is effected at 85 percent conversion, and about 60 percent when termination of polymerization is effected at 70 percent conversion, and corresponding intermediate levels of conversion when polymerization is terminated at levels between 70 and 85 percent conversion.

4. The method of claim 3 wherein the lubricant is selected from the group consisting of paraffin wax, low molecular weight polyethylene, oxidized polyethylene, calcium stearate and N,N'-ethylene-bis-stearamide.

5. The method of claim 3 wherein the lubricant comprises at least two components, at least one of which is selected from the group consisting of carnauba wzx, montan wax and fatty acids having from about 8 to about 20 carbon atoms and their metal salts and esters, and at least one of which is selected from the group consisting of low molecular weight polyethylene, oxidized polyethylene, and amides derived from fatty acids having from 1 to 20 carbon atoms.

6. The method of claim 5 wherein the stabilizer includes an organo-tin stabilizer having the formula

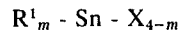

$$R^1_m - Sn - X_{4-m}$$

wherein
  1. m is an integer from 1 to 3;
  2. $R^1$ is a radical selected from the group consisting of alkyl, aryl, alkaryl and aralkyl radicals;
  3. X is a radical selected from the group consisting of radicals having the formulas $-OR^2$, $R^2COO-$, $R^2OOCR^3COO-$, $-SR^2$, $-SR^3OH$, $-OOCR^3SH$, $-SR^3COOR^2$, $-SR^3COO-R^3-COOR^3S-$, $-OOCR^3COO-$ and $-SR^3COO-$, which radicals, when divalent, may be bound to the same or a different Sn atom, wherein
     a. $R^2$, which may be the same or different, is selected from the group consisting of alkyl, aryl, alkaryl and aralkyl radicals, and
     b. $R^3$, which may be the same or different, is a divalent bridging group selected from the group consisting of alkylene, arylene, aralkylene and alkarylene radicals.

7. The method of claim 1 wherein the short-stopping agent is a sulfur-containing organo-tin stabilizer 8. The method of claim 7 wherein the polymerization is conducted at a temperature within the range of from about 40° to 75°C., and wherein polymerization is terminated at conversion between 70 and 85 percent.

9. The method of claim 8 wherein the polymerization is conducted in the presence as additive of dispersed pigment and dispersed or dissolved lubricant and stabilizer which have been added to the polymerization vessel before conversion of monomer to polymer exceeds about 80 percent when termination of polymerization is effected at 85 percent conversion, and about 60 percent when termination of polymerization is effected at 70 percent conversion, and corresponding intermediate levels of conversion when polymerization is terminated at levels between 70 and 85 percent conversion.

10. The method of claim 9 wherein the lubricant comprises at least two components, at least one of which is selected from the group consisting of carnauba wax, montan wax and fatty acids having from about 8 to about 20 carbon atoms and their metal salts and esters, and at least one of which is selected from the group consisting of low molecular weight polyethylene, oxidized polyethylene, and amides derived from fatty acids having from 1 to 20 carbon atoms.

11. The method of claim 10 wherein the short-stopping agent is a sulfur containing organo-tin compound selected from the group consisting of di-n-butyl tin S,S′ bis-(isooctyl mercapto acetate), di-n-butyl tin-bis-mercaptopropanoate, di-n-butyl mercapto bis-(isobutyl thiolgycolate), n-butyl tin tris-(isobutyl thioglycolate, and tri-n-butyl tin isobutyl thiogloclate.

12. The method of claim 11 wherein the short-stopping agent is di-n-butyl tin S,S′-bis-(isooctyl mercapto acetate).

13. The method of claim 12 wherein the pigment comprises, in combination, calcium carbonate and titanium dioxide, wherein the lubricant comprises, in combination paraffin wax and oxidized low density polyethylene, and wherein the stabilizer includes calcium stearate.

14. The method of claim 12 wherein the pigment comprises, in combination, calcium carbonate and titanium dioxide, wherein the lubricant comprises, in combination, paraffin wax and N,N′-ethylene-bis-stearamide, and wherein the stabilizer includes calcium stearate and epoxidized soya-bean oil.

15. The product obtained by the method of claim 1.

16. The product obtained by the method of claim 13.

17. The product obtained by the method of claim 14.

18. The method of claim 1 wherein the additive includes dispersed polymeric polymer modifier.

19. The method of claim 18 wherein the polmerization is conducted in the presence as additive of dispersed pigment, dispersed polymeric polymer modifier, and dispersed or dissolved lubricant stabilizer which have been added to the polymerization vessel before conversion of monomer to polymer exceeds about 80 percent when termination of polymerization is effected at 85 percent conversion, and about 60 percent when termination of polymerization is effected at 70 percent conversion, and correspondingly intermediate levels of conversion when polymerziation is terminated at levels between 70 and 85 percent conversion.

20. The method of claim 19 wherein the polymeric polymer modifier includes an impact improver which tends to reduce the rate of polymerization, the impact improver being added to the polymerization vessel when the degree of conversion is up to 20 percent, by weight based on the monomer charge, less than the predetermined level of conversion.

21. The method of claim 20 wherein the impact improver is an interpolymer of butadiene, styrene, and an ethylenically unsaturated polar monomer.

22. The method of claim 21 wherein the polar monomer is methyl methacrylate.

23. The method of claim 22 wherein the polymeric polymer modifier includes polymethylmethacrylate as a processing aid.

24. The method of claim 19 wherein the polymeric polymer modifier includes an impact improver which does not tend to reduce the rate of polymerization, the impact improver being added to the polymerization vessel with a stabilizer prior to initiation of polymerization.

25. The method of claim 23 wherein the impact improver is chlorinated poly(vinyl chloride) or chlorinated polyethylene.

26. The product obtained by the process of claim 23.

27. The method of claim 7 wherein the short-stopping agent is a sulfur containing organo-tin compound selected from the group consisting of di-n-butyl tin S,S′-bis-(isooctyl mercapto acetate), di-n-butyl tin-bis-mercaptopropanoate, di-n-butyl mercapto bis-(isobutyl thioglycolate), n-butyl tin tris-(isobutyl thioglycolate), and tri-n-butyl tin isobutyl thioglycolate.

28. The method of claim 7 wherein the short-stopping agent is di-n-methyl tin S,S′-bis-(isooctyl mercapto acetate).

29. The method of claim 10 wherein the short-stopping agent is di-n-methyl tin S,S′-bis-(isooctyl mercapto acetate).

30. The method of claim 28 wherein the pigment comprises, in combination, calcium carbonate and titanium dioxide, wherein the lubricant comprises, in combination paraffin wax and oxidized low density polyethylene, and wherein the stabilizer includes calcium stearate.

31. The method of claim 1 wherein said pigment is added to the polymerization vessel before termination of the polymerization, said polymerization being terminated at levels between 70 and 90 percent conversion.

32. The method of claim 31 wherein said pigment is in the form of a dry powder or in a liquid medium consisting essentially of water added to the polymerization vessel before termination of the polymerization.

33. The method of claim 32 wherein said pigment is added to said polymerization vessel in a liquid medium consisting of water.

34. The method of claim 31 wherein said pigment comprises titanium dioxide.

35. The method of claim 1 wherein said short stopping agent is selected from the group consisting of alpha-methylstyrene and nuclear-substituted lower alkyl and halogen derivatives thereof.

36. The method of claim 35 wherein said short stopping agent is alpha-methylstyrene.

37. The method of claim 1 wherein said polymerization is conducted in the presence of dispersed pigment, dispersed polymeric polymer modifier, and dispersed or dissolved lubricant and stabilizer, wherein between about 1 and about 15 percent pigment and between about 0.2 and about 5 percent by weight lubricant based upon the weight of vinyl chloride polymer are employed, and between about 0.01 and about 3.0 percent by weight of short stopping agent based upon the monomer charge is employed.

38. A vinyl chloride polymer composition comprising porous, homogeneous vinyl chloride polymer particles having lubricant, stabilizer pigment and short stopping agent additives substantially incorporated within each of said polymer particles, said stabilizer not being a short stopping agent for the polymerization of vinyl chloride.

39. The method of claim 1 wherein unreacted monomer and polymer products are removed from said polymerization vessel, and steps (a), (b) and (c) are repeated utilizing fresh monomer charge and additives.

40. The method of claim 1 wherein said suspending agent is polyvinyl alcohol, methylcellulose or gelatin.

41. The method of claim 40 wherein the suspending agent is polyvinyl alcohol.

* * * * *